United States Patent [19]
Löchle et al.

[11] Patent Number: 6,089,120
[45] Date of Patent: Jul. 18, 2000

[54] VEHICLE OPERATING PEDAL UNIT

[75] Inventors: Manfred Löchle, Stuttgart; Dieter Papenhagen, Waiblingen, both of Germany

[73] Assignee: DaimlerChrysler AG, Stuttgart, Germany

[21] Appl. No.: 09/161,558

[22] Filed: Sep. 28, 1998

[30] Foreign Application Priority Data

Oct. 31, 1997 [DE] Germany .......................... 197 48 145

[51] Int. Cl.[7] .................................................. G05G 1/14
[52] U.S. Cl. ................................. 74/514; 74/560
[58] Field of Search ............................. 74/514, 513, 560, 74/512

[56] References Cited

U.S. PATENT DOCUMENTS

| | | |
|---|---|---|
| 5,241,936 | 9/1993 | Byler et al. . |
| 5,295,409 | 3/1994 | Byram et al. .............................. 74/514 |
| 5,385,068 | 1/1995 | White et al. .......................... 74/560 X |
| 5,806,376 | 9/1998 | Papenhagen et al. ................. 74/560 X |

FOREIGN PATENT DOCUMENTS

| | | |
|---|---|---|
| 195 03 335 | 12/1995 | Germany . |
| 195 31 735 | 2/1997 | Germany . |
| WO 89/07706 | 8/1989 | WIPO . |

*Primary Examiner*—Mary Ann Battista
*Attorney, Agent, or Firm*—Klaus J. Bach

[57] ABSTRACT

In a motor vehicle operating pedal unit with a pedal lever pivotally mounted in a pedal housing and a return spring connected to the pedal lever which is pivotally supported by a bearing sleeve inserted into a bearing bore of the pedal housing, a pedal position sensor unit including a sensor housing having integrally formed therewith a slide cylinder is mounted onto the pedal housing such that the slide cylinder is received within the bearing sleeve. The slide cylinder includes a sensor shaft having an end extending into the sensor housing for cooperation with sensor components determining the angular position of the sensor shaft which is interconnected with the pedal lever for movement together with the pedal lever.

4 Claims, 2 Drawing Sheets

VEHICLE OPERATING PEDAL UNIT

BACKGROUND OF THE INVENTION

The invention relates to a vehicle operating pedal unit for motor vehicles with a pedal mounted on a pedal lever which is pivotally supported on a pedal housing and biased to a pedal rest position by a return spring. A pedal lever bearing is formed by a bearing sleeve which is inserted into a bearing bore of the pedal housing and receives a slide cylinder including a sensor shaft cooperating with a pedal lever position sensor disposed in a sensor housing which is mounted on the pedal housing in the area of the bearing bore.

Such a vehicle operating pedal unit is described, for example, in U.S. Pat. No. 5,806,376. This vehicle operating pedal unit can be manufactured in a simple manner such that series manufacture, particularly preassembly of the unit, is facilitated. In this arrangement, the transmission of the pedal lever motion or, respectively, its position to the vehicle engine occurs electronically or respectively, electrically by a sensor shaft and a sensor member sensing the shaft or pedal lever position. The sensor member cooperates with the sensor shaft and is disposed in a sensor housing which is mounted on the pedal housing. Cables extending over a bearing sleeve provided for the pedal lever act as a friction brake giving a driver a particular operating feel during operation of the pedal. A hollow slide cylinder is inserted through a bearing bore of the pedal housing and through the bearing sleeve and the sensor shaft extends into the interior of the hollow slide cylinder. The slide cylinder has a double function: on one hand, it is used for firmly locking the bearing sleeve in position—axially and rotationally, and, on the other hand, it provides a guide and slide structure for the sensor shaft.

In the vehicle operating pedal unit according to U.S. Pat. No. 5,806,376, the hollow slide cylinder is inserted from one side axially into the bearing bore of the pedal housing and consequently into the bearing sleeve whereas the sensor housing is placed onto the opposite side over the bearing bore and is then connected to the pedal housing. The pivot angle of the pedal unit, however, is only about 20° and is consequently, relatively small. This means that the components determining the position of the pedal must be very sensitive and must have very small tolerances.

It is the object of the present application to improve the vehicle operating pedal unit so as to further simplify the mass production and to provide for greater accuracy and operating security regarding the pedal position.

SUMMARY OF THE INVENTION

In a motor vehicle operating pedal unit with a pedal lever pivotally mounted on a pedal housing and a return spring connected to the pedal lever which is pivotally supported by a bearing sleeve inserted into a bearing bore of the pedal housing, a pedal position sensor unit including a sensor housing having integrally formed therewith a slide cylinder is mounted onto the pedal housing such that the slide cylinder is received within the bearing sleeve. The slide cylinder includes a sensor shaft having an end extending into the sensor housing for cooperation with sensor components determining the angular position of the sensor shaft which is internally interconnected with the pedal lever for movement together with the pedal lever.

With the combination of the slide cylinder and the sensor housing into a single component, the accuracy of the components determining the pedal movement is substantially increased. Furthermore, there are no sensing inaccuracies resulting from tolerances and installation variations. For example, there are no transverse movements between the individual parts which would result in sensing in accuracies.

Another advantage of the arrangement according to the invention resides in a simplification of the assembly since the slide cylinder and the sensor housing can be installed in the pedal unit in a single step.

Advantageous embodiments of the invention will be described below on the basis of the accompanying drawings:

DESCRIPTION OF A PREFERRED EMBODIMENT

Figure 1:
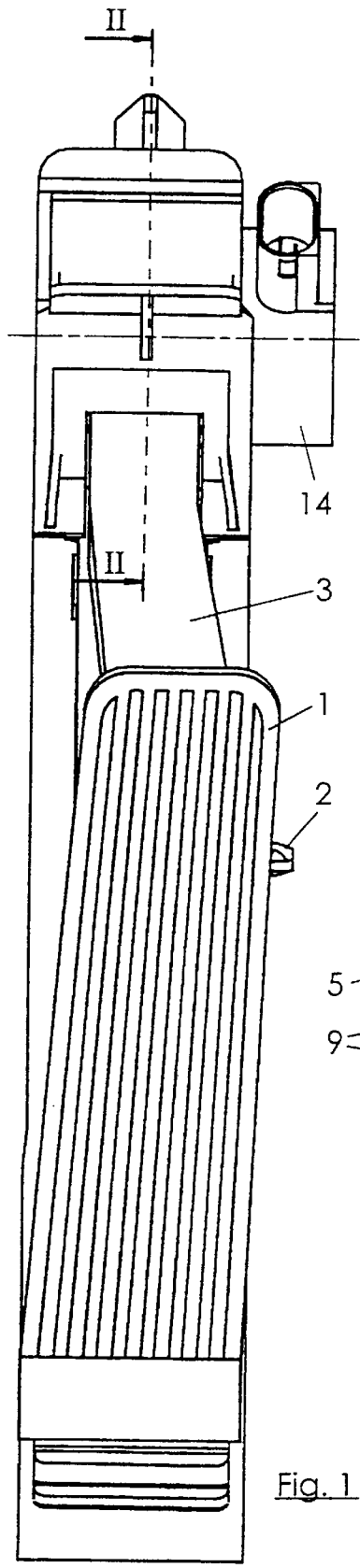
FIG. 1 shows a vehicle operating pedal unit.
Figure 2:
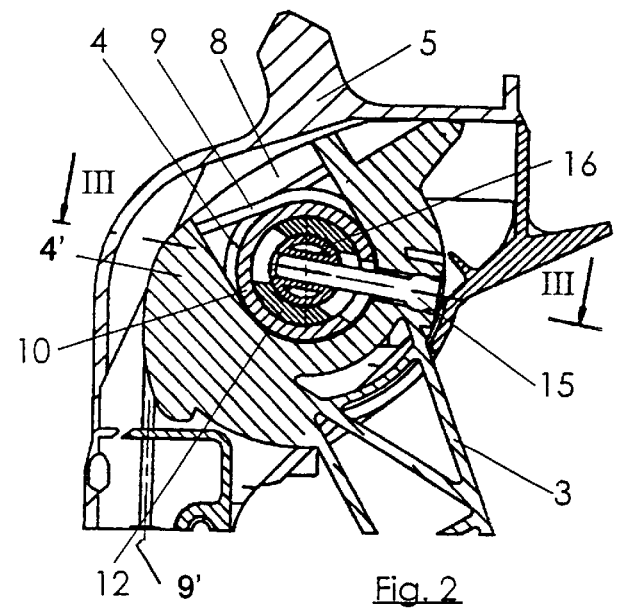
FIG. 2 is a cross-sectional view taken along line II—II of FIG. 1.
Figure 3:
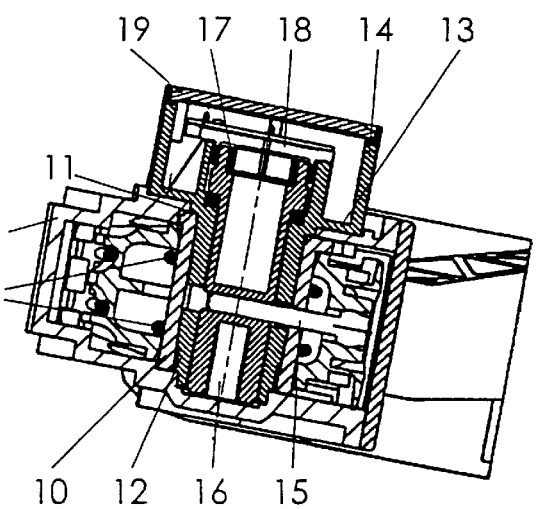
FIG. 3 is a cross-sectional view taken along line III—III of FIG. 2.
Figure 4:
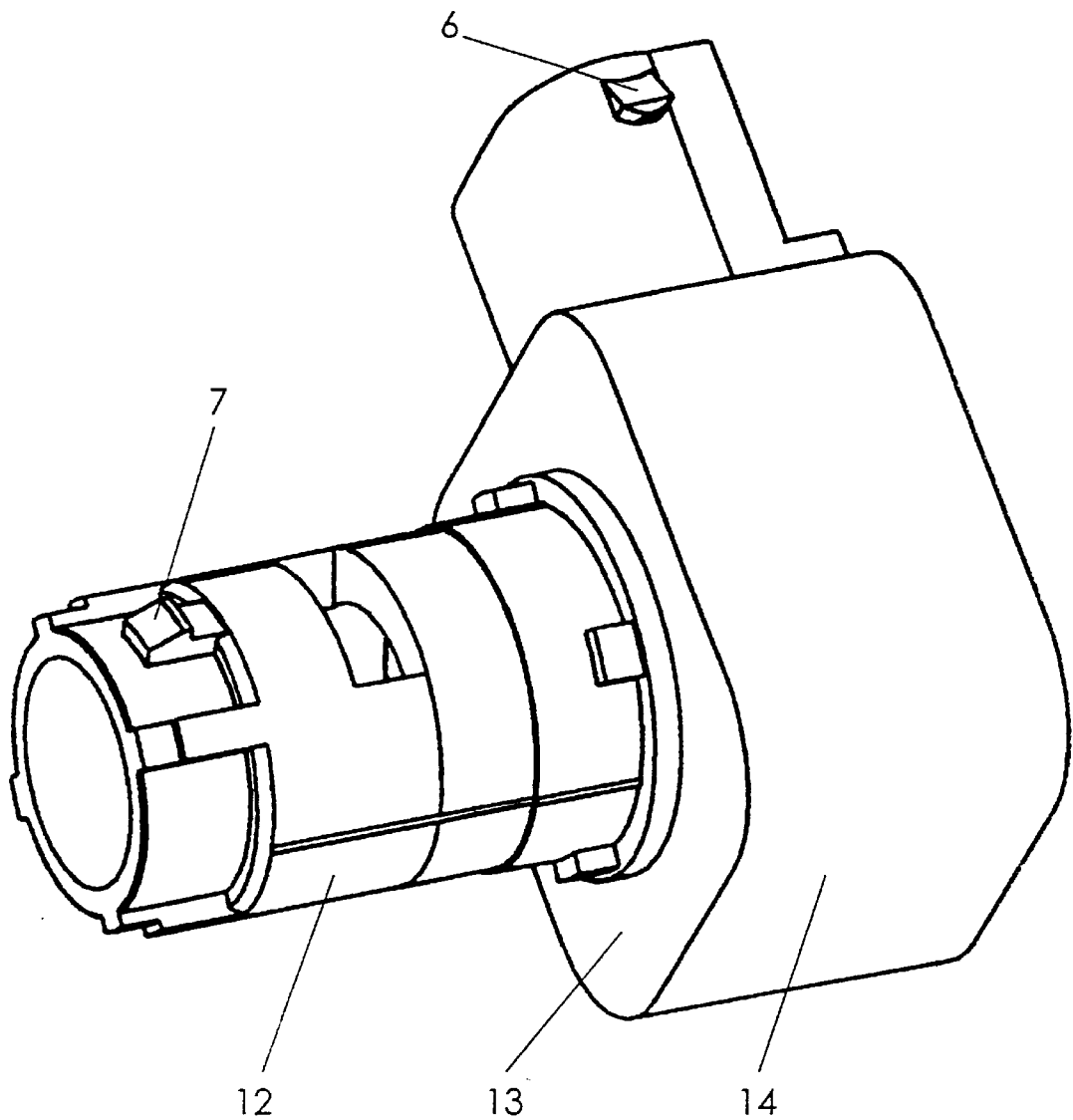
FIG. 4 is an enlarged perspective view of the component consisting of the slide cylinder and the sensor housing.

Since the vehicle operating pedal unit design and its operation are known in principle, that is the vehicle operating pedal unit is essentially of the type shown and described in U.S. Pat. No. 5,806,376, only the portions important for the invention will be described below in detail. Other design details are available from U.S. Pat. No. 5,806,376 which is incorporated herein by reference. The vehicle operating pedal unit includes a pedal 1, which is connected to a pedal lever 3 by a plug-in connection 2. At its end remote from the plug-in connection 2, the pedal lever 3 is pivotally supported on the pedal housing 5. After the complete assembly of the vehicle operating pedal unit, the pedal housing 5 and the components preassembled thereon is mounted on a vehicle wall in any desired way.

The pedal lever 3 has a bearing eye portion 4' and includes two parallel partial circumferential slots 8 arranged side-by-side and extending around part of the outer circumferential wall by way of which two parallel cables 9 extend into the interior. The cables 9 extend around a bearing sleeve 10, which is inserted into a bearing bore 4 of the pedal housing 5 and the bearing bore 4 of the pedal lever 3. The cables 9 are connected to return springs 9' biasing the pedal lever 3 in a pivot direction away from the pedal housing. The bearing sleeve 10 has an axial length which is somewhat greater than the width of the bearing eye portion 4'. In this way, the bearing sleeve 10 is received in the bearing bore 4 without play and is firmly engaged between the walls of the pedal housing 5 while the pedal lever is freely pivotable. The bearing sleeve 10 acts as friction sleeve disposed between the cables 9 extending around the bearing sleeve 10 and the inner circumferential wall or respectively, the bearing bore 4 of the bearing eye portion 4' of the pedal lever 3. A slide cylinder 12 is inserted into the mounting bore 11 of the pedal housing 5 from one side (in the drawing from the right side) so as to extend into the free interior space of the bearing sleeve 10. The slide cylinder 12 is integrally formed with a sensor housing 14 by way of an annular bottom wall 13.

The bearing sleeve 10 includes a window through which a carrier pin 15 extends with some clearance which carrier pin 15 is mounted on the pedal lever 3. The carrier pin 15 additionally extends transversely through a sensor shaft 16, which is inserted from the open side of the sensor housing 14 into the slide cylinder 12. As a result, the sensor shaft 16 is connected, by way of the carrier pin 15, with the pedal lever 3 and consequently with the pedal 1. This means that the sensor shaft 16 follows the movement of the pedal 1. Since the sensor housing 14 is firmly connected, by way of a plug-in connection including engagement members 6 and 7, with the pedal housing 5 and the bearing sleeve 10 at the insert end of the slide sleeve 12, a window of an appropriate size must be provided in the circumferential wall of the slide cylinder 12 so that uninhibited pedal movement is possible. For this reason, the window in the bearing sleeve 10 must be in radial alignment with the window in the slide cylinder 12.

The sensor housing 14 includes measuring components which are not shown, but which cooperate with the sensor shaft 16 in a non-contacting fashion to determine the pedal position. To this end, the sensor shaft 16 is provided, at its end in the sensor housing 14, with an annular magnet 17, which cooperates with a conductor plate 18 provided for example with a Hall sensor. A Hall sensor senses, in a contact-free fashion, changes of the magnetic flux and converts them into electrical signals which are conducted out of the sensor housing 14 in a way not disclosed in detail.

After completion of the assembly the open front end of the sensor housing 14 is closed by a cover 19.

With the arrangement of the slide cylinder 12 and the sensor housing 14 as a single piece structure and their jointure by way of the annular bottom wall 13, which is provided to accommodate the larger diameter of the sensor housing 14 with respect to the slide cylinder 12, there is no need for a seal between the slide cylinder 12 and the sensor housing 14. As a result, the connection between the sensor housing or, respectively, the unit comprising the slide cylinder 12 and the sensor housing 14 with the pedal housing 5 can be established in a simple manner by a snap-in engagement of locking members 6 and 7. A seal, for example, by a cement layer between the sensor housing 14 and the pedal housing 5 as it is required in the state-of-the-art arrangements can be omitted.

The unit consisting of the slide cylinder 12 and the sensor housing 14 can be manufactured in a simple manner of plastic material generally by injection molding. If desired, the sensor housing 14 may be additionally secured to the pedal housing 5 by screws.

What is claimed is:

1. A vehicle operating pedal unit for a motor vehicle comprising a pedal housing having a bore, a bearing sleeve firmly supported in said pedal housing co-axially with said bore, a pedal lever having a bearing eye pivotally supported on said bearing sleeve, a pedal supported at one end on said pedal housing and engaging said pedal lever adjacent its other end for operating said pedal lever, a return spring acting on said pedal lever, a pedal position sensor unit including a sensor housing having integrally formed therewith a slide cylinder extending from one side of said pedal housing into said bearing sleeve through said pedal housing bore and being firmly connected to said pedal housing so as to be non-rotatable relative thereto, a sensor shaft rotatably supported in said slide cylinder extending into said bearing sleeve and having an end disposed in said sensor housing for cooperation with sensor components sensing the angular positions of said sensor shaft, and a carrier pin extending through radially aligned windows in said cylinder and said bearing sleeve and having opposite ends, one mounted in said sensor shaft and the other in said pedal lever bearing eye, thereby operatively interconnecting said pedal lever and said sensor shaft for movement of said sensor shaft in unison with said pedal lever.

2. A vehicle operating pedal unit according to claim 1, wherein said sensor housing has an annular bottom wall which extends between said slide cylinder and said sensor housing, said annular bottom wall said sensor housing being seated on said pedal housing.

3. A vehicle operating pedal unit according to claim 2, wherein said sensor housing and said slide cylinder include snap-in members for engagement with said pedal housing.

4. A vehicle operating pedal unit according to claim 1, wherein said pedal position sensor unit comprising said sensor housing and said slide cylinder are formed integrally from a plastic material.

* * * * *